United States Patent [19]

Porter et al.

[11] 4,251,952

[45] Feb. 24, 1981

[54] PLANT SEED COATING

[75] Inventors: Frederic E. Porter, St. Louis Park; James M. Scott, Minneapolis, both of Minn.

[73] Assignee: Sandoz Ltd., Basel, Switzerland

[21] Appl. No.: 64,028

[22] Filed: Aug. 6, 1979

[51] Int. Cl.³ .............................................. A01C 1/06
[52] U.S. Cl. ................................. 47/57.6; 47/DIG. 9
[58] Field of Search ........................... 47/57.6, DIG. 9

[56] References Cited

U.S. PATENT DOCUMENTS

| | | | |
|---|---|---|---|
| 1,319,157 | 10/1919 | Lingle | 47/57.6 X |
| 2,502,809 | 4/1950 | Vogelsang | 47/57.6 |
| 2,690,388 | 9/1954 | Hale | 47/57.6 |
| 2,967,376 | 1/1961 | Scott | 47/57.6 |
| 3,284,209 | 11/1966 | Kelley | 47/57.6 X |
| 3,499,748 | 3/1970 | Fraser | 47/57.6 X |
| 3,545,129 | 12/1970 | Schreiber et al. | 47/57.6 X |
| 3,600,830 | 8/1971 | Hamrin | 47/57.6 |
| 3,698,133 | 10/1972 | Schreiber | 47/57.6 |
| 3,703,404 | 11/1972 | Kirk | 47/57.6 X |
| 4,068,602 | 1/1978 | Mickus et al. | 47/57.6 X |

FOREIGN PATENT DOCUMENTS 6909440 12/1970 Netherlands .............................. 47/57.6

*Primary Examiner*—Robert E. Bagwill
*Attorney, Agent, or Firm*—Gerald D. Sharkin; Richard E. Vila

[57] ABSTRACT

Plant seeds designed for germination without substantial delay are coated with a first layer of a mixture of sugar and a water insoluble polymeric material, and have a particulate coating adhered to the first layer while the first layer is still tacky, the first layer being preferably formed from an aqueous coating composition which is cured by simple removal of water therefrom.

32 Claims, No Drawings

PLANT SEED COATING

This invention relates to the coating of plant seeds, including compositions and method therefor, and the coated seeds produced thereby.

The coating of plant seeds has been long known and practiced. It represents an additional expense in materials and processing, but offers a variety of individual or combined advantages which have tended to outweigh these expenses. Distinct coating operations may be recognized, such as simple dusting with a fungicide or bactericide to protect against disease, and more complex operations involving the application of polymer coatings to delay germination and/or carry a particulate material for one or more beneficial purposes. For example, coating seeds to add weight renders them more resistant to water and wind erosion. By including pH modifiers or nutrients in the coating, the immediate soil environment of the seed can be advantageously modified to one more favorable to the germination of the seed and growth of the resulting plant. In soils which are infected with bacteria or contaminated with chemicals, appropriate bactericides or protective materials can be included in the coating to combat the bacteria or provide a protective shield against the chemical contaminants. Hence, in many cases the coating of seeds either can be used to eliminate or substantially reduce the need to treat the broad area in which a crop is to be grown and accordingly can represent a savings in the time and expense to making such broad applications, or to accomplish objectives such as erosion resistance which are not otherwise readily obtainable. In addition, a substantial portion of broadly-applied material may be removed from the desired location by the action of wind or water, thus further diminishing desirability of such methods. Seed coating, in contrast to broad application, generally has the advantage of placing the additives contained in the coating at the site where their effect is desired and thus also avoids the uncertainty of broad distribution and/or the need and expense of mixing broadly applied material into the soil to reduce or avoid such uncertainty.

A number of factors bearing on the state of the art in coating seeds is reflected in the current literature, eg. an article "Coat Seeds with Polymer", in "CHEMTECH" 8, 284–287 (May 1978), wherein various techniques and the economic aspects of seed coating are discussed.

The use of polymeric materials, both natural and synthetic, in seed coating has, as previously indicated, been well known. While polymeric materials have been used for the special purpose of delaying seed germination, see, for example, U.S. Pat. Nos. 3,621,612 and 3,947,996, the vast majority of applications and potential applications are in the area of seeds coated for other purposes where a substantial delay in germination would be a disadvantage. Because of the desire to avoid germination delays in such cases, it has been the general practice in the art to coat seeds with water soluble polymers such as methyl cellulose, gum arabic and the like, the idea being that the coating would disintegrate or dissolve away rapidly in contact with water such that germination would not be delayed. There have been, however, various limitations in the use of water soluble polymers including not only physical limitations which have left room for improvement but also, and perhaps primarily, the water soluble systems have been relatively expensive because of the cost of the equipment necessary to deal with such factors as the residence time needed to remove the large amounts of water used to apply the water soluble adhesives. Batch rather than continuous manufacture has also been dictated by the nature of such operations. The tendency to produce fragile coatings has also been a serious drawback.

The idea of using a water insoluble polymer in the coating of seeds designed to germinate without substantial delay is not new but to my knowledge has not been given wide acceptance as a solution to the problems in this area. The systems described in U.S. Pat. No. 3,808,740 are based on the use of certain water insoluble polymers bonding a particulate material to the seed and offer considerable advantages, but have required the general use of organic solvents and present the problems attendant the use of such solvents, eg. the danger of explosion and the cost of equipment to reduce the risk of explosion. It was also found that the need to employ a high proportion of organic solvent resulted in polymer penetration of porous seeds, thereby making the coating of porous seeds such as grass seeds more expensive by requiring more material for complete coating and/or of a lesser quality than obtained with non-porous seeds.

The objects of the present invention are concerned with improvements in the coating of seeds with polymeric materials normally forming water insoluble coatings.

In accordance with the present invention, an improvement involves a seed coating, directly in covering contact with the seed surface, which is an intimate mixture of sugar and a water insoluble polymer. Such coatings may be formed with liquid compositions containing sugar and a water insoluble polymeric material in a liquid carrier media which may be either water or an organic solvent and in which either one or both of the sugar and the polymer material are either dissolved or dispersed. The water insoluble polymer coating forming material is desirably to completely pre-formed water insoluble polymer, in contrast to a pre-polymer or pre-polymer system, and hence capable of forming a water insoluble polymer coating from the coating composition by simple removal of the liquid media from the composition, such as by evaporation and/or absorption into another body or material such as the seed itself and/or a particulate material which is added to the coated seed prior to drying or complete cure of the polymer-containing composition. In accordance with a particularly practical aspect of the invention, the coating of the invention is advantageously formed from a polymeric material which is insoluble in water and which is capable of forming a coating from an aqueous medium upon simple removal of water from the coating composition. Since sugar dissolved or dispersed in water is similarly capable of drying upon the simple removal of water, and since sugar has been found to form the desired coatings in conjunction with such water insoluble polymers from aqueous media, it follows that aqueous systems in which the preformed polymer is dispersed and the sugar dissolved or dispersed constitute a simple, efficient and highly advantageous means of forming the coatings of the invention. It is generally preferred that the sugar be actually dissolved in such aqueous compositions. While such aqueous systems may also contain organic solvents which facilitate curing, or for other purposes, it is also generally preferred that such aqueous compositions be essentially solvent free and curable at more or less ambient temperature upon the removal of water from the composition. The term "preformed" as used herein with reference to the polymer component of the coating composition mean a polymeric material forming a film or coating without polymerization or other chemical reaction causing an increase in molecular weight of the polymer. The term "curable upon simple removal of water" and the like as used with reference to such preformed polymer means a pre-formed polymer forming the film or coating from an aqueous media in which the polymer is dispersed, by way of suspension of fine particles, emulsification and the like, by evaporation and/or other removal of water such as by absorption into the seed or another material, and therefore such term is intended to further distinguish from those polymers which chemically react with water in the process of film formation. Such term is not intended to rule out the use of heat to facilitate evaporation but, as indicated, the preferred polymers and compositions are curable at room temperature. The term "water insoluble polymer" and the like as used herein refers to water insolubility at room temperature, the preferred materials being insoluble in water at temperatures of at least 50° C.

The present invention, therefore, in one aspect thereof, provides seed coating compositions which are aqueous mixtures of sugar and a dispersed preformed water insoluble polymeric material, which polymeric material and composition are curable on simple removal of water, the sugar being contained therein in an amount of from ⅛ to 6 parts by weight of sugar per part by weight of said polymeric material, preferably from ⅜ to 4 parts of sugar per part of polymeric material, and desirably ⅜ to 2 parts by weight. In all such compositions the sugar is preferably dissolved in the water. It has been found that sugar combines very well with the water insoluble polymers applied from an aqueous mixture in which the sugar is dissolved or dispersed to form a coating of very good physical properties in contact with the seed surface, yet the sugar allows for rapid transmission of water when planted such that germination delays are essentially avoided.

A wide variety of polymeric materials form water insoluble coats from liquid media and are subject to use in forming the polymer/sugar seed coating of the present invention. Synthetic polymers are generally preferred. Polymers forming water insoluble coatings in and from organic solvent solutions may be employed, including those in which the solvent may also substantially dissolve the sugar component. Prepolymers and similar systems reactively combining in the presence of various substances including water may also be used. The preferred polymeric materials, as indicated, are the pre-formed water insoluble polymers which form coatings from aqueous dispersions on the simple removal of water. Particularly suitable among such pre-formed polymeric materials forming coatings from aqueous dispersions are the vinyl acetate polymers containing at least 25% by weight vinyl acetate, preferably at least 50%, and especially the homopolymers of vinyl acetates. Also included among the particularly suitable materials are the vinyl acetates which have been hydrolyzed to form polyvinyl alcohols which are nevertheless still water insoluble by reason of low degree of hydrolysis and/or their high molecular weight. The particularly preferred type of such pre-formed polymeric materials are the vinyl acetate polymers containing at least 50% by weight of vinyl acetate and a number of aqueous adhesive formulations based essentially thereon are commercially available including those commonly classed as white glue. The particularly preferred polymers are polyvinyl acetate homopolymers, especially those of higher molecular weight, normally greater than 300,000 and ranging up to 1,200,000, or even greater, as determined by Gel Permeation Chromatography. Such particularly preferred polymers are represented by a number of commercially available white glue formulations which are particularly suitable forms for practice of the invention. Such formulations commonly have a solids content of 40–65% by weight that usually includes a small amount of protective colloid (about 2–6%) such as polyvinyl alcohol (eg. about 83% hydrolyzed) along with even smaller total amounts of preservatives such as formaldehyde.

The term "sugar" is used herein in the broad sense to indicate any of the well known class of sweet carbohydrates having 6 or 12 carbon atoms in the molecule i.e. the monosaccharides and disaccharides, and capable of being processed into a fine, essentially powdered form. Examples of such sugars include without limitation sucrose, glucose, maltose, dextrose, lactose, levulose and mixtures thereof including invert sugar. The preferred sugars are the disaccharides and sucrose is the particularly preferred sugar. Since water is useful as the medium for the polymer/sugar coating components of this invention, the sugar need not be employed in solid form. Hence, syrups, such as sugar syrups, "corn sweeteners" or "corn syrup", may be used to provide the sugar component, and simple sugar syrups are generally preferred. When employed in solid form, the sugar should of course be finely divided and good results have also been obtained with ordinary granulated sugar.

In accordance with the more detailed aspects of the invention there is provided seeds in which an agriculturally acceptable particulate material is adhered to the coating formed from the mixture of sugar and water insoluble polymer. The production of such seeds is suitably accomplished by mixing the seeds with a particulate material after coating with the polymer/sugar composition but prior to the complete curing thereof, whereby the particulate material is taken up by the coating composition and is adhesively bonded thereby upon completion of the curing to form essentially an outer or second coating of particulate material bonded to and/in the inner or first coating of cured polymer/sugar composition. Most practical applications of the invention include the addition of the particulate material for one or more of several desired purposes.

It has been indicated in our work of particular interest that the coating of seeds with coating compositions containing only the water insoluble polymers (with no sugar), especially from aqueous compositions, tends to be less easily accomplished in the desired manner and in most if not substantially all cases produces a coated seed product of apparently inferior quality in terms of such factors as completeness of the coating and/or smoothness of the coating, as well as the inability of the coating to satisfactorily adhere the same substantial amounts of particulate material as the sugar-containing coating compositions of the invention. No certain explanation for the beneficial properties of the sugar/water insoluble polymer combination is apparent.

The particulate material bonded to the seeds by the polymer/sugar coating of the invention may be essentially any finely divided agriculturally acceptable material in the sense of not being toxic to the seed or harmful to the soil environment in which the seed is to be planted. Calcium carbonate in various forms such as marble dust is of broad general interest for adding weight and/or raising the pH of acid soils in the environment of the seed. Other metal containing compounds and minerals also of particular interest are gypsum, metal silicates and chelates of various micronutrient metals such as iron, zinc and manganese which are useful in correcting micronutrient soil deficiencies. Additional mineral materials of an inorganic nature that may be mentioned include talc, rock powder, elemental sulfur and vermiculite. Carbon such as activated carbon is useful in forming protective or "safener" coatings which protect the seed against potentially harmful chemicals in the soil such as previously applied pesticides. Various organic materials may also be employed, such as peat, coffee grounds, nut shells and the like to improve the growing medium, fungicides to combat or prevent disease and stimulants to accelerate growth. Inoculants such as nitrogen fixing bacteria may also be added by the coating of a particulate carrier therefor onto the polymer/sugar coating seed. As indicated, there is essentially no limit to the type of finely divided materials which may be adhered to the seeds to achieve any one or more benefits in connection with the handling, planting, germination and growth of the seeds and/or in connection with the environment in which seeds have been or are to be planted. Specific materials for specific seeds and purposes, by way of illustration only, include lime (calcium carbonate) coatings for leguminous plant seeds, such as forage legumes and soybeans, and for grasses, to increase weight and/or raise the pH of the seed zone soil; micronutrient coatings of chelated zinc for corn, rice, sorghum and wheat, and chelated iron for soybeans, sorghum and corn; carbon safener coatings on grasses; weight increasing coatings on rice and grasses; and gypsum coatings on rice, wheat and forage legumes. Mixtures of different particulate materials may of course be employed and the same seeds may be given multiple coatings with the same or different particulate materials used in the different particulate layers.

The coating of seeds in accordance with the invention may be carried out on a batch or continuous basis. The seeds may be also coated in a single step or stage operation in the sense that a finished product may be produced in the same apparatus without separation or recovery of an intermediary product. The coating process may be carried out in equipment of known suitability for the coating of seeds. Such equipment can be a simple plastic bag or a tilted rotary drum, both adapted for batch operation, or a paddle mill for continuous production. The coating procedure is relatively simple and involves essentially the mixing of an aqueous dispersion of the polymeric coating material with sugar followed by mixing of the seed to be coated with the resulting coating composition.

The polymeric coating material is usually provided in the form of an aqueous dispersion and an upward adjustment of its water content may be desirable to provide a less viscous system which is easier to handle and better adapted for mixing with the sugar.

The polymeric adhesive material in the form of an aqueous mixture or dispersion is first combined with the sugar in the desired proportions of from $\frac{1}{8}$ to 6 parts by weight of sugar per part by weight of the polymeric material, preferably from $\frac{3}{8}$ to 4 parts of sugar per part of polymeric material, more preferably $\frac{5}{8}$ to 2 parts of sugar per part of polymeric material. The sugar is preferably added in aqueous solution such as in the form of commercially available sugar syrups. After combination the composition is mixed together by stirring or the like to obtain a uniform distribution of the solids in the aqueous medium and desirably as necessary to dissolve any sugar added in solid form. The water content of the resulting coating composition bears on a number of factors and is desirably taken into account during preparation of the composition. The primary factors to be considered include viscosity of the composition bearing on ease of mixing with and coating the seeds, cure time of the composition and moisture content of the seed in the final product. Certain of these factors such as apparent cure time and seed moisture content are also influenced by other parameters such as the amount and type of particulate material to be used. The ability of water insoluble polymers to cure faster than water soluble polymers is a definite advantage in their use that can be retained in the use of coating compositions varying in water content over a fairly wide range. In general, it is desirable to have a composition which cures relatively fast but not so quickly that the composition cannot be applied and fully coat the seeds while leaving sufficient time in the uncured tacky state to add and adhere the particulate material to the coating. Hence, on the one hand it is preferable to have a minimum water content such that the coating composition will remain tacky for a minimum period of time such as at least 1 minute, more preferably at least 3 minutes, after application to the seeds. The desirability on the other hand of having a short time for progression from the tacky to the essentially non-tacky or substantially cured state is less important and more a matter of taking advantage of the faster curing properties of the water insoluble adhesives, at least in the preferred situations where a substantial amount of particulate material is to be overcoated on the polymer/sugar coated seeds. The reason for such reduced importance in such situations is that the particulate material has the effect of substantially reducing the time at which the seeds can be recovered from processing without undesired agglomeration, and in certain cases the particulate materials themselves, such as gypsum, can absorb water and have a direct effect on reducing actual cure time. In general, it is preferred to have a water content such that curing to the essentially non-tacky state will take place within 45 minutes after application to the seeds whether or not substantial particulate material is to be added, more preferably within 5 to 30 minutes.

Moisture content of the seeds becomes important when the coated seed product is to be stored for any reasonable length of time. In such situations it is desirable to avoid increasing the moisture content of the seeds above a level of about 14%, preferably not above 12-13%, by total weight of the seeds. Since seed normally has a moisture content of about 8-10%, it becomes desirable to employ coating compositions in which the water content will not increase the moisture in the resulting seed by more than about 4-6%. If the moisture content of the final product exceeds the desired level, the removal of moisture down to the desired level can be effected but usually only by drying at elevated temperatures and other known methods which are disadvantageous because of cost and the potential for seed damage. Hence, adjustment of the moisture content of the coating composition can provide a more efficient operation when producing seeds to be stored. Also, somewhat higher viscosity compositions may be desirable with certain seeds such as grass seeds to avoid unnecessary excess penetration of the composition into the porous seed surfaces. The desired solids and water content of the coating composition therefore may be a matter of balancing of the various factors including the polymeric material itself which usually has its own individual physical characteristics which influence viscosity and other properties but in any event the preferred levels for each situation can be readily determined by simple routine experimentation. In general, the solid content of the coating composition for most applications will be in the range of from 20% to 75% by weight, more usually from 30% to 60% by weight, while viscosity from the standpoint of ease of effective coating of the seeds is preferably in the range of from 1 to 50 centipoises at 20° C., more preferably 2 to 30 centipoises.

The amount of the aqueous polymer/sugar coating composition applied to the seeds will be determined by a number of known parameters such as its type and solids content, the type of seeds to be coated, and the purpose and thickness of the desired coating, and may also vary farily widely. As a practical matter it is generally preferred to employ at least an amount which will completely coat substantially all available seed surfaces while avoiding such excess amounts that the final product cannot be recovered without undesired agglomeration within a reasonable time, of about 45 minutes, whether or not substantial particulate material is to be added. The larger amounts are usually most practical when the larger amounts of particulate material are to be added. In general, the amount of the coating composition expressed in terms of the polymer/sugar solids content thereof is for most applications in the range of from 0.5 to 8.0 parts per 100 parts by weight of seed, more usually from 1.0 to 6.0 parts of polymer/sugar solids per 100 parts of seed. In terms of the aqueous polymer/sugar composition itself, the amount thereof for most application is in the range of from 2 to 24 ml. per 100 parts by weight of seed, more usually 3 to 18 ml. of aqueous coating composition per 100 parts by weight of seed.

The seeds may be treated with the coating composition simply by adding the coating composition to the seed mass and mixing together to obtain a substantially full distribution of the coating over the exposed seed surfaces in a more or less uniform manner. Such coating is preferably facilitated by introducing the coating composition into the seed mass as a spray or in similar divided form, and agitation of the seed mass at the time of introduction can further assist in obtaining the desired distribution. In any event, mixing of the seeds after introduction of the coating composition results in the desired distribution within a short period of time, generally within 3 minutes, and more usually between 5 seconds to 2 minutes. The seed mass after coating of the seed surfaces with the liquid coating composition may be subjected to more or less continued mixing which may continue until the nontacky state is reached, and/or the seeds placed on a conveyer belt treated with a mold release material or otherwise routinely processed to obtain a product in which the seeds are coated by the cured polymer/sugar composition of the invention. While such a product may be again coated in accordance with the invention and/or otherwise treated or used, it is of limited value and most practical application of the invention will utilize the liquid coated seeds directly for purposes of adhering a particulate material thereto and obtaining any one or more of the several advantages offered by such type of product.

The step of adding the particulate material to the seeds is conveniently and preferably commenced as soon as the seeds have been substantially completely coated with the liquid coating composition or soon thereafter, but in any event while the coating composition remains in the tacky state. As essentially previously indicated, such addition may take place within a very short time after the initial addition of coating composition to the seeds, and under preferred conditions is usually effected within 10 minutes after such addition, more usually within 5 minutes, and often within a matter of even a few seconds. The particulate material, depending upon the type of processing employed, may be added while the coated seeds are in the static state or while the coated seed mass is in motion or otherwise being mixed. Similarly depending upon the method employed, the particulate material may be added all at once, or at controlled rates in the form of a stream or preferably a more distributed mass as obtained, for example, by metering or shaking of the particulate material.

The particle size of the particulate material may vary fairly widely but in general is smaller than the seed itself and usually substantially smaller to insure optimum adhesion to the seed. Most materials will be sufficiently finely divided if they pass a 100 mesh (U.S. or Tyler) screen, and preferably will have at least a major portion also passing a 200 mesh screen. Thus, most of the particles will be smaller than 150 microns and a large number of them will be smaller than 75 microns. A typical rule of thumb for "lime" coating with ground marble or other calcium carbonate forms is that 80% or more (by weight) of the particles should be smaller than 75 microns. There is virtually no lower limit to the particle size, but, as a practical matter, most particles will be larger than one micron. If the particles are relatively large, eg. larger than 100 mesh, they are preferably flakelike in shape for better adhesion.

The amount of particulate material added and adhered to the coated seed surface may also vary fairly widely but will usually depend on various factors basically related to the objectives to be accomplished by the particulate coating and the amounts necessary to achieve the objectives with the selected particulate material. The amount of the polymer/sugar composition coated on the seed surface is also a factor which can vary the amount of particulate that can be effectively added. In terms of weight amount a general range is from 3 to 200 parts by weight per 100 parts by weight of seed to form the outer coating adhered to the coating composition which is in contact with the seed surface. Heavier materials such as marble dust may be employed in the higher amounts of from 75 to 200 parts by weight per 100 parts of seed, preferably 100 to 180 parts per 100 parts of seed, where substantial increase in the weight of seed is desired. In most other cases the amount of particulate material will usually vary from 10 to 60 parts per 100 parts of seed, more usually from 15 to 40 parts per 100 parts of seed. It is not necessary that the amount of particulate material be at a level sufficient to satisfy the full adherence capacity of liquid coating on the seed and the minor amounts of from about 3 to less than 10 parts of particulate material may be used although the desired objectives are usually only fully satisfied with such lower range amounts with the lighter density or more potent or concentrated additives. The addition of the particulate material substantially shortens the time within which the polymer/sugar coating and the resulting product will become sufficiently non-tacky as a whole that mixing of the seeds can be stopped and the seed mass allowed to rest without undesirable agglomeration of the seeds. It is therefore generally desirable to add the particulate material in amounts which have a substantial reducing effect on processing time, in most cases from 10 to 200 parts by weight per 100 parts by weight of the originally uncoated seed, and thereby obtained the cost savings attendant therewith.

During and/or after the addition of the particulate material the resulting seed mass is agitated or otherwise mixed as necessary to obtain a more or less full distribution and uptake of the particulate material on the coating which covers the seed surfaces. Such distribution is usually accomplished in a very short time, typically 5 seconds to 5 minutes depending largely on batch size, the type of process being employed and the need or desire to obtain a maximum uptake of the particulate material by the coating.

The continued mixing or other agitation of the seed mass after distribution of the particulate material is only necessary to the extent of the time remaining, if any, to obtain a product which is sufficiently non-tacky as a whole that mixing of the seeds can be stopped and the seed mass, after routine further processing such as to break up any agglomerates and package, allowed to rest in storage without undesirable agglomeration of the seeds to the extent that breaking up of any agglomerates will cause substantial damage, eg. to more than 3% of the seeds, by way of a tearing away or other removal of the inner polymer/sugar coating which is in direct adhesive contact with the seed. Such point in time when the mixing of the seeds may be ceased without undesired agglomeration after whatever further processing is desired may be referred to as "effective cure" time and the like, even though at such point the coating composition itself may not be completely dry or finally cured. In many cases under preferred conditions the effective cure time and the point where mixing can be stopped without substantial agglomeration of any kind can occur simultaneously or within a few seconds of each other. A number of factors will vary the time, if any, after addition and distribution of the particulate material at which mixing may be stopped, such as the particular compositions of the liquid coating including the amount of water therein. The type of seeds being coated is also a factor since the seeds will absorb water to varying degrees and such absorption will also remove water from the coating liquid and reduce cure time. However, as the particulate material is applied over the liquid coating, it can be a more important factor in reducing the time until the mixing of the seed can be stopped. Many particulate materials absorb water to some extent, thus having a direct effect on facilitating cure of the liquid coating composition. Certain materials such as certain forms of gypsum will take up water and accordingly have a substantial lower effect on cure time. Nevertheless, the addition of particulate material to the liquid sugar/water insoluble polymer coating, even when the particulate material not hydroscopic in nature, tends to form a relatively dry overcoat on the seeds with the result that the time to separation of the seeds without causing undesired agglomeration is substantially hastened. It is for these reasons that it is advantageous to employ the particulate material in amounts which under the conditions involved will enable mixing to be stopped and the product recovered without undesired agglomeration within a practical and efficient time after addition of the particulate material, such as within 15 minutes, desirably within 10 minutes. Generally, from 15 to 200 parts by weight of particulate material per 100 parts by weight of seed will substantially reduce processing time with lesser amounts of the lower density materials required to obtain such objective without the use of solvents or heat to facilitate curing or drying. In preferred embodiments of this invention employing a number of different particulate materials it has been possible to achieve recovery within 10 minutes after addition of the particulate material eg. 20 seconds to 7 minutes, without the use of solvents or heat. In fact, in these embodiments recovery has been possible and effective curing effected as soon as the particulate material was distributed over the liquid coated seeds for the time sufficient to achieve substantially the maximum uptake of the particulate material either in terms of the uptake capacity of the tacky coating or other uptake as possible under the processing conditions of an amount pre-determined to give an effective cure simultaneously with the completion of the distribution step. Hence, it will be evidence that an effective curing can be effected during the distribution step and in good measure due to the particulate material itself.

After recovery of the particulate coated seeds the product may be treated in a routine manner such as by milling to break up any agglomerates, such milling being preferably accomplished prior to a full cure of the polymer/sugar composition to reduce the possibility of undesired damage to the coating. The coated seed product may also be screened to remove broken or undersized seeds, and any particulate material not adhering to the seeds. Where desired or required the seeds after adding of the particulate material or after recovery may be mildly heated, eg. by heated air at a temperature not above 180° F., and/or treated to facilitate evaporation of water such as by passing under an evacuation hood connected to a blower, but, as indicated, the invention may be operated in its preferred embodiments without the need for such additional procedures to assist curing of the polymer/sugar coating composition.

The particulate material may be dispersed in the polymer/sugar coating composition as a minor constituent thereof and form a part of the adhesive inner coating to which the bulk of the particulate material will be later added and adhered. Generally speaking, however, the highest loading of particulate material are obtained by adding all or substantially all of the particulate material after coating with the polymer/sugar composition, whereby the particulate material becomes mostly bonded to the coating as a second or outer layer with respect to the inner polymer/sugar coating or layer. The particulate material may also be added and distributed onto the seeds in staged portions while the underlying adhesive coating is still in the tacky state. Such procedure is usually of value only when different particulate materials are to be used and it is desired to be assured that a predetermined amount of one of the materials, the first to be added, is adhered to the coated seed. In such cases the amount of the first added material is such as to not take up the entire absorption capacity of the coated seed, and the second material is added promptly after a distribution of the first material (while the coating is still tacky), and preferably in a sufficient amount to assure a maximum amount of the second material is adhered to the seed.

The coated seeds provided by the invention with particulate material adhered as an outer or second layer to and/or in the first layer of polymer/sugar coating composition may be again coated in accordance with the coating process of the invention by repeating the application of coating composition and particulate material one or even more times for purposes of adding additional desired amounts of particulate material which may be the same or different relative to the particulate material originally used, and/or for purposes of adding additional weight. A single replication of the coating process is usually sufficient for most purposes related to weight or delivery of particulate materials when not satisfied by the original application. However, two or more coating replications are also useful in producing seeds "sized" for various purposes such as handling and machine planting. Such subsequent coatings using the polymer/sugar coating compositions have little or no adverse effect on germination time. The seeds produced in accordance with the invention having one or more double layer coatings of the polymer/sugar coating covered by a particulate layer may be readily used as such or further processed for various purposes. For example, smoothness of the exposed surface of the coated seed can improve flow and other handling characteristics and may be simply accomplished by continuing to mix the finally coated seed for a short time, eg. 2-10 minutes, after the full distribution and uptake of the particulate material forming the outer or final particulate layer have been accomplished. The outer particulate surface may also be effectively smoothed to increase flowability by applying a thin finishing or sealing coat of a water insoluble polymer applied from a dilute inert organic solvent solution. The application of a finishing coat may also be desirable as insurance against the coated seeds being subjected to unusual and/or prolonged storage conditions where dampness or other high moisture conditions which might cause such an excessive uptake of water by one or more of the coated seed components that the coated seeds will tend to agglomerate or otherwise lose their integrity. The finishing coat can improve water resistance and/or assist in maintaining integrity under high moisture conditions. The finishing coating may also be referred to as a sealing coating but is applied in minor amounts such that only a partial seal rather than a true or full seal of the water insoluble polymer is obtained. Hence, the seed after the partial sealing is nevertheless sufficiently porous that sufficient moisture can be absorbed to enable germination without substantial delay by reason of the total coatings on the seed including the finishing or sealing coating. A wide variety of water insoluble polymers including pre-polymer systems and those forming porous coatings due to chemical reaction in the coating process can form suitable sealing coats from dilute organic solvent solutions. Various hard waxes such as carnuba wax, polyurethanes, polyurea, epoxy/polyester resin systems, bisphenol epichlorohydran resins, cyclopentadiene copolymers, various other varnishes and the like are representative of suitable sealing polymers. Many of these polymers may be unsuitable when applied from more concentrated solutions and/or in lare amounts as they tend to form heavier coatings which can completely seal the coated seed. Hence, it is generally desirable to employ dilute organic solvent solutions having a polymer (or polymer precursor) content of from 2 to 20 percent by weight, more usually 5 to 15 percent by weight, and to apply the solutions in an amount sufficient to partially seal the coated seed while avoiding amounts which would cause a substantial delay in germination time. Such suitable amounts are preferably in the range of from 0.05 to 1.5 percent by weight of the coated seed to be sealed, more usually from 0.1 to 0.5 percent by weight. A preferred sealant is a polyurea varnish as described in U.S. Pat. No. 3,808,740 when applied from a dilute solution, preferably 10% by weight in acetone, which contains an isocyanate prepolymer and ketamine as a co-polymerization agent typically in equal weight amounts, optionally along with water as a polymerization or curing agent to convert the reactants to a water insoluble coating. It has been found that in many cases water can be excluded and sufficient amounts to cure provided by moisture in the particulate coated seeds even though an effective cure has been effected. The sealing composition may thus be applied prior to or after either effective or final curing of the sugar/polymer coating, preferably after effective curing. The finishing or sealing coat is applied in the usual manner for coating, viz. by thoroughly distributing the organic solvent solution over the otherwise final or outer particulate coating on the coated seeds, and effecting a curing of the composition in a conventional manner as appropriate for the sealing composition which has been used.

The coatings disclosed herein including the sealing coating may effect slight delays in germination time although little or no delay has been statistically observed. Germination is not deemed substantially delayed for purposes of definition herein when germination is not delayed beyond seven days under germination conditions by reason of the total cumulative effect of all sugar/polymer coatings and any sealing coating applied and compared to seeds free of any coating. Delays beyond four days are generally considered undesirable and can be readily avoided in practice of the invention with which our experience more particularly indicates delays of typically 0 to 2 days.

The invention is applicable to the coating of all types of plant seeds including all angiospermous and gymnospermous plant seeds, and advantages offered by the invention can be realized in connection with all such seeds. Seeds judged to be of the most immediate particular commercial interest for coating by the invention include the leguminous plant seeds and also rice seed.

The following examples illustrate the present invention.

EXAMPLE 1

To 1 gallon of white glue having a 55% solids content (balance water) and obtained commercially from H. B. Fuller Co. under the designation S-6930 is added 1 gallon of water followed by mixing for 5 minutes to obtain a uniform mixture to which is then added 1 gallon of 66° Brix sucrose syrup (66% by weight of sucrose in water). The resulting mixture is blended for 10 minutes to again obtain a uniform adhesive coating mixture which is charged to the spray holding tank of a standard paddle mill having a 6 foot long paddle mill trough which is 10 inches in diameter. La Belle rice seed in the amount of 600 pounds is charged to the seed bins of the paddle mill and fed into the upstream end of the paddle mill trough through a partitioned metering roll at the rate of 80 pounds per minute. The adhesive coating mixture is applied to the rice seed from a spray nozzle located 6 inches from the upstream end at a rate of 3.2 pints per minute. At a point 18 inches from the adhesive distribution point a finely divided (minus 200 mesh) chelated zinc is applied to the adhesive mixture coated rice seed from a metering auger at a rate of 8.5 pounds per minute. The chelated zinc is obtained under the trade designation Zinc Ke-Min from the Georgia Pacific Corporation and is a zinc chelated with lignosulfonate that is useful in correcting zinc deficiencies in croplands. The thus coated seed traverses the remaining travel distance in the troughs during which time the zinc material is uniformly distributed and the adhesive coating sufficiently cured to permit recovery of the coated seed which is then milled to remove unused zinc material and undersized, broken, hulled and agglomerated seeds.

EXAMPLE 2

Starbonnet rice seed in the amount of 4,000 grams is placed in a plastic bag and treated with 184 ml. of a white glue/sucrose mixture prepared as in Example 1. The bag is shaken for 30 seconds to distribute the adhesive on the rice seeds. There is then added to the bag 280 grams of Zinc Ke-Min and the bag is shaken for an additional 1 minute. There is then finally added to the bag 800 grams of pulverized (minus 200 mesh) calcium sulfate (molding plaster grade) followed by shaking for 1 more minute. The resulting seeds are then screened to remove fines and obtain 4,554 grams of coated seed product.

EXAMPLE 3

The cured coated rice seeds of Example 2 (one or more days after preparation) are sealed or overcoated by mixing together with a 10% solids content (by weight) solution of a polyurea varnish forming composition in acetone, using a commercially available polyurea varnish as contemplated in Example II of U.S. Pat. No. 3,808,740, and the paddle mill equipment of Example 1. About 2 pints of acetone solution are applied by spray for each 100 pounds of the coated rice seed. The solution is water free and uses largely moisture in the air to effect curing. The acetone solvent is removed by evaporation with the aid of an in-line high speed air blower to obtain a coated seed product whose germination time is substantially the same as the coated product of Example 2 even though the basic purpose of the polyurea overcoat is the creation of a harder surface which will have increased moisture resistance. The sealing coating in this Example may also be applied in about 10 minutes after final processing of the seed as described in Example 2 such that the moisture necessary for curing of the polyurea system is supplied from both the air and from the coated seeds of Example 2 themselves.

EXAMPLE 4

Sorghum seed, NK-262, in the amount of 12 pounds is placed in a plastic bag and shaken for 45 seconds with 261 ml of a white glue/sucrose adhesive mixture prepared as in Example 1. There is then added to the bag 500 grams of chelated iron (minus 200 mesh) obtained under the trade designation Iron Ke-Min from the Georgia Pacific Corporation and constituting an iron/-lignosulfonate chelate. After shaking for 1 minute another 200 ml. of the same adhesive mixture is added followed by shaking for 1 minute and then the adding of an additional 300 grams Iron Ke-Min and shaking for 1 more minute. The resulting multi-coated seed is finally overcoated or sealed by treating with an acetone polyurea varnish solution followed by removal of the acetone by evaporation, as in Example 3, above. Germination rate for the resulting seed is at least about 90% with no substantial delays due to the coating.

EXAMPLE 5

A rotating drum adjustably mounted to hold various angles of inclination is charged to about one-third its capacity with 15 pounds of soybean seed and then 134 ml. of the white glue/sucrose adhesive mixture of Example 1 are added while the drum is rotated. The adhesive mixture is distributed after addition by continued rotation of the drum and hand mixing for 30 seconds after which 545 grams of Iron Ke-Min are added and rotating and hand mixing continued for an additional 30 seconds to distribute the chelated iron. The thus coated seeds are then tumbled in the rotating drum for an additional 5 minutes to smooth and polish the coating on the seeds. The resulting coated seeds while still in the drum are treated with 150 ml. of 10% polyurea varnish acetone solution used in Example 3 followed by evaporating the acetone under the influence of a high speed air blower.

EXAMPLE 6

Into a plastic bag containing 100 grams of red fescue grass seed is added 15 ml. of the polyvinyl acetate/sugar coating composition employed in Example 1. The contents of the bag are shakened for 1 minute to uniformly distribute the coating composition over the surface of the grass seeds and form a uniform tacky coating of the coating composition thereon. There is then added to the bag 150 grams of 1:1 mixture of gypsum and water ground marble dust and the resulting contents of the bag again shaken for 1 minute to obtain a final coated seed product in which the original weight of the seed is increased by about 150%.

EXAMPLE 7

To 1 part by weight of the white glue of Example 1 is added 1.33 parts of water and 0.66 parts of granulated sugar followed by mixing for 20 seconds to obtain a composition in which a substantial portion of the sugar remains undissolved. The resulting composition in the amount of 4 ml. is promptly added to a plastic bag containing 100 g. of alfalfa seeds and the contents of the bag mixed by shaking for 30 seconds to distribute the coating composition. There was then added to the bag 20 g. of water ground marble dust (calcium carbonate) obtained under the registered trademark ATOMITE followed by shaking for an additional 30 seconds to obtain a good quality coated seed product.

Similarly good results (in repeating Example 7 above) are obtained when: (1) employing 6 ml. of the coating composition and 40 g. of ATOMITE; and (2) employing sugar syrup in place of the granulated sugar in equivalent amounts of sugar and water relative to the polyvinyl acetate solids at the rates of 4 ml and 6 ml of coating composition with 20 g. and 40 g. of ATOMITE, respectively. However, repeating any one of the runs above indicated in this Example 7 without the inclusion of sugar but with the same amount of water as a viscosity adjustment results in a substantially less satisfactory coating of the seeds.

The coatings obtained in the foregoing examples using white glue maintain their overall integrity in water for a substantially longer period than those produced in the examples hereinafter given, but nevertheless germinate without substantial delay.

EXAMPLE 8

A coating composition is prepared by thoroughly mixing together equal volumes of an aqueous dispersion of ion-linked and modified ethylene interpolymers obtainable under the registered trademark designation 56220 SURLYN 2 (S2) having a solids content of 31.0% by weight and a 66° Brix sucrose syrup. Such coating composition in the amount of 6 ml. is charged into a plastic bag containing 100 g. of alfalfa seeds and the contents of the bag mixed by shaking for 30 seconds to distribute the coating composition. There was then promptly added to the bag 40 grams of ATOMITE followed by shaking for an additional 30 seconds whereupon there was obtained a good quality coated seed having a relatively heavy or thick coating of calcium carbonate.

A coated seed product of similar quality but with a lighter calcium carbonate coating is similarly obtained with 4 ml. of the coating composition and 20 g. of calcium carbonate. It is of interest that similar runs made without the sugar syrup, either diluting the SURLYN with water (1:1) or without dilution with water, produce a visability inferior product with a considerable amount of free (unbonded) calcium carbonate fines.

EXAMPLE 9

The procedure of Example 7 is repeated but employing in place of the white glue a commercial white enamel paint obtained from Pratt & Lambert under the registered trademark EFFECTO and containing 30% titanium dioxide, 30% soya alkyd resin, 36.1% petroleum distillate and 1% non-volatile dryer, which paint is mixed together in an amount of 10 ml. with 10 grams of granulated sugar to form the coating composition. Such coating composition in the amount of 10 ml. is applied to 250 g. of alfalfa seeds followed by 60 grams of ATOMITE to obtain a good quality coated seed.

EXAMPLE 10

The procedure of Example 9 is repeated but employing in place of the white glue an acrylic copolymer of 46% solids content obtained under the registered trademark designation UBATOL 3114. The coating composition in the amount of 4 ml. is applied to 100 g. of alfalfa seeds followed by 20 g. of ATOMITE to obtain a good quality coated seed.

EXAMPLE 11

A coated seed product is also prepared following the procedure of Example 10 but using an acrylic polymer of similar solids content and available under the trademark UBATOL 3112.

EXAMPLE 12

The procedure detailed Example 8 is repeated but employing in place of the SURLYN an acrylic copolymer of 25% solids content obtainable under the registered trademark designation HYCRYL A-2000, whereby a good quality coated seed product is also obtained.

A good coating on rice and alfalfa seeds is also obtained employing a terephthalate polymer obtained from the H. B. Fuller Co. under the designation S-6928.

What is claimed is:

1. In a coated plant seed comprising a seed having a coating thereon comprising of polymeric material in direct contact with the normally exposed seed surface; the improvement comprising employing as such coating an intimate mixture of sugar and water insoluble polymeric material, the sugar being present in said coating in an amount of from $\frac{1}{8}$ to 6 parts by weight per part by weight of said polymeric material.

2. A coated seed product in accordance with claim 1 in which the ratio of sugar to water insoluble polymeric material is from $\frac{3}{8}$ to 4 parts by weight of sugar per part by weight of polymeric material.

3. A coated seed product in accordance with claim 2 in which the ratio of sugar to water insoluble polymeric material is from $\frac{5}{8}$ to 2 parts by weight per part by weight of polymeric material, and in which the polymeric material is a vinyl acetate homopolymer.

4. In a coated plant seed product in accordance with claim 1 comprising a seed having a first coating thereon comprising a polymeric material in direct contact with the normally exposed seed surface and a particulate coating over and adhered to said polymer coating; the improvement comprising employing as the first coating a mixture of sugar and a water insoluble polymeric material, the sugar being present in said coating in an amount of from $\frac{1}{8}$ to 6 parts by weight per part by weight of polymeric material.

5. A coated seed product in accordance with claim 4 in which the ratio of sugar to water insoluble polymeric material is from $\frac{3}{8}$ to 4 parts by weight of sugar per part by weight of polymeric material.

6. A coated seed product in accordance with claim 5 in which the ratio of sugar to water insoluble polymeric material is from $\frac{5}{8}$ to 2 parts by weight of sugar per part by weight of polymeric material.

7. A coated seed product in accordance with claim 6 in which a second coating comprising a mixture of sugar and a water insoluble polymeric in the weight ratio of from $\frac{5}{8}$ to 2 parts of sugar per part of polymeric material covers the particulate coating over the first coating of said mixture of sugar and polymeric material, and in which a second coating of particulate material is coated over and adhered to said coating of sugar and polymeric material.

8. A coated seed product in accordance which claim 6 in which the seed is a leguminous plant seed.

9. A coated seed product in accordance with claim 8 in which the particulate material is calcium carbonate.

10. A coated seed product in accordance with claim 9 in which the polymeric material is a vinyl acetate homopolymer.

11. A coated seed product in accordance with claims 4, 6 or 7 in which a final coating consisting essentially of a water insoluble polymeric material is adhered to the otherwise final coating of particulate material in an amount sufficient to partially seal the coated seed without substantially increasing its germination time.

12. A coated seed product in accordance with claim 11 in which the polymeric material underlying the particulate coating or coatings is a vinyl acetate homopolymer and in which the water insoluble polymeric material of the final coating is polyurea.

13. A coated seed product in accordance with claims 4, 6 or 7 in which the polymeric material is a vinyl acetate homopolymer.

14. A coated seed product in accordance with claims 4, 6 or 7 in which the seed is rice seed or a leguminous plant seed.

15. In the process of coating plant seeds comprising distributing a liquid coating composition over the normally exposed surface of the plant seeds, distributing a particulate material over the resulting liquid coated seed surface while said coating composition is still tacky and effecting at least an effective curing of the coating composition; the improvement comprising employing therein as the coating composition a liquid composition comprising sugar, a water insoluble polymeric material and a liquid carrier for the sugar and polymeric material, the sugar being present in said composition in an amount of from ⅛ to 6 parts by weight per part by weight of said polymeric material.

16. The process of claim 15 in which the ratio of sugar to water insoluble polymeric material is from ⅜ to 4 parts by weight of sugar per part by weight of polymeric material.

17. The process of claim 16 in which the ratio of sugar to water insoluble polymeric material is from ⅝ to 2 parts by weight per part by weight of polymeric material.

18. The process of claim 17 in which the liquid carrier is an organic solvent in which the polymeric material is dissolved and in which the sugar is suspended.

19. In the process of coating seeds in accordance with claim 15 comprising distributing a liquid coating composition over the normally exposed surface of the plant seeds, distributing a particulate material over the resulting liquid coated seed surface while said coating composition is still tacky and effecting at least an effective curing of the coating composition; the improvement comprising employing therein as the coating composition an aqueous composition comprising water, a preformed water insoluble polymeric material dispersed in said water and sugar, and effecting the curing of said composition by the simple removal of water from said composition, the sugar being present in said composition in an amount of from ⅛ to 6 parts by weight per part by weight of said polymeric material.

20. The process of claim 19 in which the ratio of sugar to water insoluble polymeric material is from ⅜ to 4 parts by weight per part by weight of polymeric material.

21. The process of claim 20 in which the ratio of sugar to water insoluble polymeric material is from ⅝ to 2 parts by weight per part by weight of polymeric material.

22. The process of claim 21 in which the curing is effected at room temperature.

23. The process of claim 22 in which the sugar is dissolved in the water of the coating composition.

24. The process of claim 23 in which the coating composition is essentially free of organic solvents.

25. The process of claims 21 or 24 in which the seed is a leguminous plant seed.

26. The process of claim 25 in which the particulate material is calcium carbonate.

27. The process of claim 26 in which the polymeric material is a vinyl acetate homopolymer.

28. The process of claim 20 in which the seeds already coated with the coating composition in contact with the normally exposed seed surface with the particulate material adhered to the resulting coating of sugar and polymeric material is again coated with a coating composition of the same constituency followed by dispersing a particulate material over the resulting second coating of sugar and polymeric material while the coating is still tacky, and effecting at least an effective curing of said second coating of sugar and polymeric material.

29. The process of claims 19, 21, 22, 24 or 28 in which the polymeric material is a vinyl acetate homopolymer.

30. The process of claims 19, 21, 22, 24 or 28 in which the seed is rice or a leguminous plant seed.

31. The process of claims 15, 19, 21 or 28 in which a finishing coating composition comprising a water insoluble polymeric material in an inert organic solvent is distributed as a finishing coating over the exposed particulate coating in an amount sufficient to partially seal the coated seed without substantially increasing its germination time, and effecting a curing of said finishing coating composition.

32. The process of claim 31 in which the finishing coating composition comprises an isocyanate prepolymer as the polymeric material, ketamine as a co-polymerization agent and acetone as the solvent, and in which the polymeric material in the sugar containing coating composition is a vinyl acetate homopolymer.

* * * * *